United States Patent
Parlitz et al.

(10) Patent No.: US 7,692,502 B2
(45) Date of Patent: Apr. 6, 2010

(54) OSCILLATORY SYSTEM AND METHOD FOR CONTROLLING AN OSCILLATORY SYSTEM OF THIS TYPE

(75) Inventors: Ulrich Parlitz, Gleichen (DE); Alexander Ahlborn, Bovenden (DE)

(73) Assignee: Georg-August-Universitat Gottingen, Gottingen (DE)

( * ) Notice: Subject to any disclaimer, the term of this patent is extended or adjusted under 35 U.S.C. 154(b) by 563 days.

(21) Appl. No.: 11/568,842

(22) PCT Filed: Jun. 8, 2005

(86) PCT No.: PCT/DE2005/001012

§ 371 (c)(1),
(2), (4) Date: Jul. 20, 2007

(87) PCT Pub. No.: WO2005/122342

PCT Pub. Date: Dec. 22, 2005

(65) Prior Publication Data

US 2007/0280312 A1    Dec. 6, 2007

(30) Foreign Application Priority Data

Jun. 11, 2004    (DE) .................. 10 2004 028 252

(51) Int. Cl.
*H03B 29/00*    (2006.01)
(52) U.S. Cl. ................ 331/78; 331/74; 372/18; 372/29.011; 372/29.02; 250/227.11
(58) Field of Classification Search ........... 331/74, 331/78; 372/18, 29.011, 29.02; 250/227.11
See application file for complete search history.

(56) References Cited

U.S. PATENT DOCUMENTS 5,723,856 A * 3/1998 Yao et al. ............... 250/227.11

FOREIGN PATENT DOCUMENTS

DE    199 62327 A1    12/1999

(Continued)

OTHER PUBLICATIONS

K. Pyragas Experimental Control of Chaos by Delayed Self-Controlling Feedback, Physics Letters A Netherlands, vol. 180 (Aug. 30, 1993), pp. 99-102.

(Continued)

*Primary Examiner*—Arnold Kinkead
(74) *Attorney, Agent, or Firm*—Whitham Curtis Christofferson & Cook, PC

(57) ABSTRACT

The invention relates to a method for controlling an oscillatory system with the aid of at least one measured variable by the detection of at least one oscillation component ($S_x(t)$) over time (t) in the form of at least one measured variable. According to said method a control variable ($\delta_u$) for controlling the oscillatory system is determined from the sum of the weighted differences of the delayed oscillation component, which has been delayed at least twice by different delay times ($\tau_1 > 0, \tau_2 > 0$) if there is one measured variable and the respective non-delayed oscillation component and if there are several measured variables the sum of the weighted differences of the delayed oscillation components ($S_i(t-\tau_i)$), which have been respectively delayed at least once by a specific delay time ($\tau_i > 0$) and their respective non-delayed oscillation components ($S_i(t)$) according to the relationship $\delta_u = a_1 S_1(t) b_1 S_1(t-\tau_1) + \ldots + a_n S_n(t) - b_n S_n(t-\tau_n)$, wherein $a_1, \ldots, a_n$ and $b_1, \ldots, b_n$ are weighting factors for the oscillation components $S_1, \ldots, S_n$ of the measured variables.

23 Claims, 2 Drawing Sheets

FOREIGN PATENT DOCUMENTS

DE    101 08 436 A1    2/2001
WO    WO 02/066379 A2  8/2002

OTHER PUBLICATIONS

K. Pyragas Stabilization of an Unstable Steady State in Intracavity Frequency-Doubled Lasers, Physical Review E, vol. 1 61, No. 4, Apr. 2000, pp. 314-3731.

K. Pyragas, Continuous Control of Chaos by Self-Controlling Feedback, Physic Letters A, vol. 170, 1992, pp. 421-428.

W. Just, on the Mechanism of Time-Delayed Feedback Control, arXiv:chao-dyn/9611012 vl Nov 22, 1996, pp. 1-4.

W. Just, Delayed Feedback Control of Periodic Orbits in Autonomous Systems, arXiv:chao-dyn/9808007 v1: Aug. 6, 1998, pp. 1-4.

* cited by examiner

OSCILLATORY SYSTEM AND METHOD FOR CONTROLLING AN OSCILLATORY SYSTEM OF THIS TYPE

The invention relates to a method for controlling an oscillatory system having at least one measurement variable, by detection of at least one oscillation component over time in the form of at least one measurement variable.

The invention also relates to an oscillatory system for production of oscillations having a first sensor for detection of at least one oscillation component over time in the form of at least one measurement variable and having an actuating element for determination of a controlled variable for the system. By way of example, the oscillatory system has a multimode generator, in particular a frequency-doubled Nd:YAG laser for production of waves with two polarization directions, having a first sensor for detection of the wave component in the first polarization direction and having a second sensor for detection of the wave component in the second polarization direction over time. The oscillatory system may also have an Nd:YAG laser with a frequency-doubler crystal for production of unpolarized waves.

Multimode generators such as these are used, for example, as a frequency-doubled laser for production of visible light from, for example, infrared laser light. In this case, use is feasible, inter alia, in holographic displays or for optical reading of data.

In applications such as these, it is important for the intensity of the emitted frequency-doubled laser light to be as constant as possible, or at least be within a narrow predetermined tolerance band.

However, non-linear effects that occur, such as sum-frequency formation and the second harmonic as well as the relationship between the non-linear effects and the temperature and, for example, the pump current for a pump laser diode for operation of a laser in multimode operation, lead to destabilization of the output intensity. This relates not only to the frequency-doubled laser light but also to the non-frequency-doubled laser light.

WO 02/066379 A2 discloses a method for stabilization of the output power of a solid-state laser with resonant frequency multiplication, in which at least two components of the radiation which is emitted from the solid-state laser are measured, and act on at least two manipulated variables in order to regulate the output power of the laser at a constant value. Stabilization is intended to be achieved by influencing at least one second manipulated variable in order to regulate the output power of the solid-state laser, for example by pumping the solid-state laser system with two laser diodes, which are aligned in such a manner that the polarization directions of the two laser diodes are different.

In order to suppress instabilities in frequency-doubled solid-state lasers, the regulation of an Nd:YAG laser which is pumped by a pump laser diode is also described in F. Lange, T. Litz, K. Pyragas and A. Kittel "Stabilization of the Output Power of Intracavity Frequency-doubled Lasers", http://arXiv.org/abs/cond-mat/0211192 (2002). The modes which are polarized in the x direction are detected by a first detector, and the modes which are polarized in the y direction are detected by a second detector, are in each case high-pass-filtered, and are amplified. The two amplified, detected wave components in the x and y polarization directions are added, are amplified again, and are supplied, after limiting, to a bypass for current regulation of the pump laser diode.

A corresponding method is also disclosed in A. Schenck zu Schweinsberg and U. Dressler "Characterization and Stabilization of the unstable fixed points of an frequency doubled Nd:YAG laser", in Physical Review E, Vol. 63, 056210, 2001.

The time-dependent controlled variable is in this case calculated by in each case forming the difference between a time-dependent sum intensity for the x and y polarization directions and the time-dependent detected wave component of the corresponding polarization direction, and by addition of the respective differences amplified by an individual gain factor, in order to ensure a virtually constant output intensity by modulation of the controlled variable onto the pump current for the pump laser diode.

However, the control systems are unsuitable for frequency-doubled multimode lasers and when using relatively high pump currents. When a plurality of modes start to oscillate in different polarization directions, the chaos that occurs is more difficult to regulate. Furthermore, the chaotic dynamics that then occur are correspondingly rapid and place additional requirements on the control system, as a result of the progress in miniaturization.

Applications with frequency-doubled multimode lasers with relatively high pump currents are, however, of particular interest because of the higher intensity of the frequency-doubled light.

One object is thus to provide an improved method for controlling an oscillatory system by detection of at least one oscillation component over time in the form of a least one measurement variable, by means of which stabilization and regulation at a constant output variable of the multimode generator are ensured even in the case of the chaotic dynamics which occur, for example, with relatively high laser pump currents.

The object is achieved according to the invention by the method of this generic type, by determination of a controlled variable $\delta_u$ for controlling the oscillatory system from the sum of the respective weighted differences of the oscillation component, which has been delayed in the case of one measurement variable at least twice by different delay times, and its respective undelayed oscillation component, and in the case of a plurality of measurement variables, oscillation components, which have in each case been delayed at least once by a specific delay time, and their respective undelayed oscillation components using the relationship $$\delta_u = a_1 S_1(t) - b_1 S_1(t-\tau_1)t + \ldots + a_n S_n(t) - b_n S_n(t-\tau_n),$$

where $a_1, \ldots, a_n$ and $b_1, \ldots, b_n$ are weighting factors for the oscillation components $S_1, \ldots, S_n$ of the measurement variables.

It has been found that the use of at least two time-delayed oscillation component signals as well as weighted superimposition for the creation of the control signal leads to a considerable reduction in intensity fluctuations which occur in the unregulated system and, in particular, is suitable for stabilization of frequency-doubled lasers with relatively high pump rates.

The delay times for the oscillation components and/or measurement variables are different.

The determined controlled variable ($\delta_u$) is preferably amplified by a gain factor k which need not necessarily be greater than or equal to unity, but may also be less than unity. This gain factor k may be chosen to be constant, and may be matched to the modulation point for controlling the oscillatory system.

For the case of a multimode generator as an oscillatory system, such as a laser, at least one first and second polarization direction is preferably detected as the measurement variable.

The delay time for the first polarization direction should preferably be chosen and set to have a different duration to the delay time for the second polarization direction. This allows better stabilization.

It is also advantageous for the controlled variable $\delta_u$ to be modulated onto the pump current of a pump laser diode which is used for operation of a frequency-doubled laser. In the case of a system such as this, the control method can be used for compact lasers with very fast dynamics, with frequencies of more than one MHz.

By way of example, the oscillation components are delayed by a line, making use of the finite speed of propagation of signals for delay purposes. Digital delay lines can alternatively also be used.

One advantageous embodiment provides for the oscillation components in each polarization direction to in each case be delayed by all-pass filter elements, the number of which is governed by the delay time that is required for the dynamics. In order to prevent distortion of the chaotic output signal from the oscillatory system within the control system, the all-pass filter elements should be operated as Bessel filters. This ensures a frequency-independent group delay time, which means that the signal is not distorted during the delay process.

Trimming elements can be provided within the delay chains in order to compensate for component tolerances and in order to stabilize the amplitude of the control signal to be delayed.

For the case of a multimode generator as an oscillatory system, such as a laser, which discloses only unpolarized oscillations, only these oscillation components are detected.

A further object of the invention is thus to provide an improved oscillatory system, such as a multimode generator, in particular an improved Nd:YAG laser with a frequency-doubler crystal.

According to the invention, the object is achieved by means of an oscillatory system of this generic type, or a multimode generator, by means of an actuating element for determination of a controlled variable $\delta_u$ from the sum of the weighted differences of the oscillation component, which has been delayed in the case of one measurement variable at least twice by different delay times ($\tau_1, \tau_2$), and its respective undelayed oscillation component, and in the case of a plurality of measurement variables, oscillation components ($S_i(t-\tau_i)$), which have in each case been delayed at least once by a specific delay time ($\tau_i$), and their respective undelayed oscillation components ($S_i(t)$)t using the relationship $$\delta_u = a_1 S_1(t) - b_1 S_1(t-\tau_1) t \ldots + a_n S_n(t) - b_n S_n(t-\tau_n),$$

where $a_1, \ldots, a_n$ and $b_1, \ldots, b_n$ are weighting factors for the oscillation components $S_1, \ldots, S_n$ of the measurement variables and the controlled variable ($\delta_u$) is used to control the oscillatory system.

A difference between an undelayed oscillation component and an oscillation component delayed by the time $\tau_i$ can in each case optionally be replaced by a notch filter with a matched Q-factor and bandwidth.

The delay times and/or the cut-off frequencies of the notch filters may be varied dynamically (quasi-statically, periodically or chaotically) in a specific range.

Advantageous embodiments are described in the dependent claims.

The invention will be explained in more detail in the following text, by way of example, using the attached drawings, in which.

Figure 1:
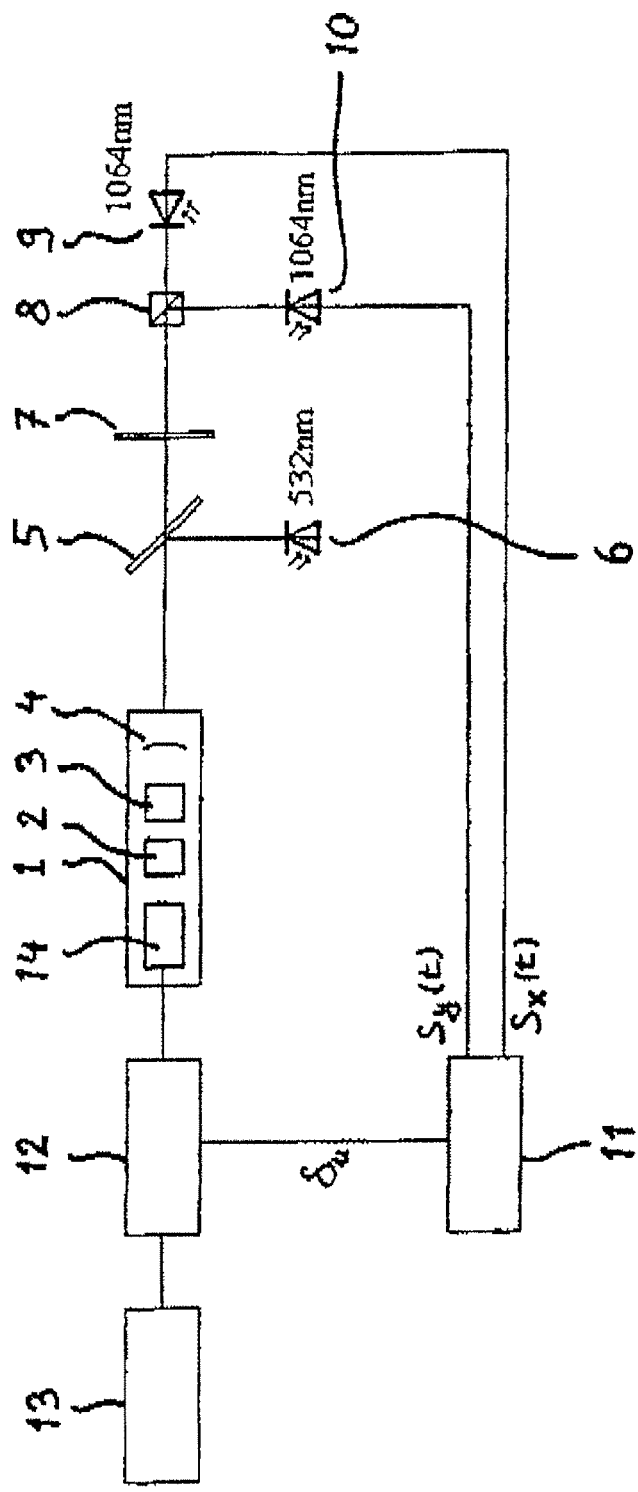
FIG. 1 shows a schematic illustration of an Nd:YAG laser with sensors for detection of the wave components in the x and y polarization directions, and with an actuating element according to the invention.

FIG. 1 shows a block diagram with a frequency-doubled laser 1 which contains an Nd:YAG solid-state crystal 2, which is pumped by a pump laser diode 14, with the resultant laser beam being passed to the exterior through a frequency-doubler crystal 3 and a mirror 4. That portion of the laser radiation that has been created which passes through the frequency-doubler crystal 3 is converted by the frequency-doubler crystal 3 to laser light at half the wavelength of, for example 532 nm. This laser light at half the wavelength can be deflected by a frequency-selective mirror 5 and can be recorded by a suitable detector 6, for example for optical reading of data.

The frequency un-doubled laser radiation which passes through the frequency-selective mirror 5 is filtered by a gray filter 7, and is passed to a polarization filter 8. The gray filter 7 allows only that laser radiation whose frequency has not been doubled to pass through, with the oscillation component $S_x(t)$ of the laser radiation whose frequency has not been doubled and which is in the x polarization direction being detected by a first detector 9 at the output of the polarization filter 8 for the x polarization direction. The oscillation component $S_y(t)$ for the y polarization direction is detected in a corresponding manner by a second detector 10.

The unpolarized oscillation component which is detected by the detector 6 can also optionally be supplied to the actuating element 11 for determination of a controlled variable $\delta_u$.

The x oscillation component $S_x(t)$ of the laser beam modes in the x polarization direction and the y oscillation component $S_y(t)$ of the laser beam modes in the y polarization direction are supplied to an actuating element 11 for determination of a controlled variable $\delta_u$. The controlled variable $\delta_u$ is passed to a bias circuit 12 for regulation of the laser 1. The laser 1 has a pump laser diode 14, which is operated with the aid of a laser diode controller 13 via the bias circuit 12 and optically pumps the solid-state crystal 2.

The laser diode controller 13 is first of all used to set a constant pump current for the pump laser diode 14. The controlled variable signal $\delta_u(t)$ then acts on the pump current $I_p$ of the pump laser diode 14 via a modulation point.

Figure 2:
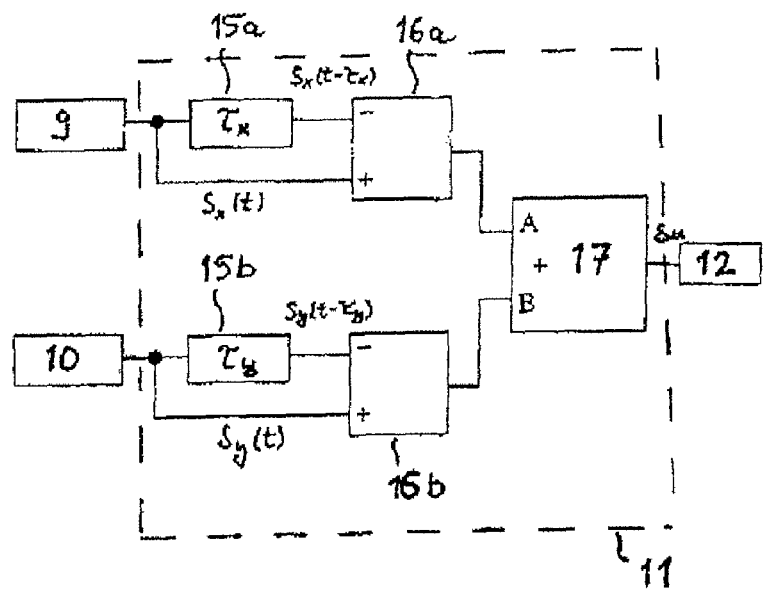
FIG. 2 shows a block diagram of one embodiment of the actuating element according to the invention.

FIG. 2 shows a block diagram of one exemplary embodiment of an actuating element 11, whose input is connected to the first and second sensors 9, 10, and whose output is connected to the bias circuit 12.

The intensity of the laser light whose frequency has not been doubled is converted in the respective polarization direction x, y to a photovoltage, with the aid of the two sensors 9, 10. The AC voltage component of this photovoltage is referred to as the oscillation component $S_x(t)$ for the x polarization direction and $S_y(t)$ for the y polarization direction. A delay element 15a, 15b is provided for each of these oscillation components $S_x(t)$ and $S_y(t)$, in order to delay the oscillation components $S_x(t)$ and $S_y(t)$ by a delay time $\tau_x$ and $\tau_y$, respectively. The undelayed oscillation components $S_x(t)$ and $S_y(t)$ and the respective delayed oscillation components $S_x(t-\tau_x)$ and $S_y(t-\tau_y)$ are passed to a first differential amplifier 16a for the x oscillation component $S_x(t)$ and to a second differential amplifier 16b for the y oscillation component $S_y(t)$. The differential amplifiers 16a, 16b each have attenuators on the input side, for signal mixing.

At least one delay element 15 and at least one differential amplifier 16 are therefore provided for both polarization directions x, y of the laser radiation whose frequency has not been doubled.

The delay time $\tau_x$ for the x polarization direction and the delay time $\tau_y$ for the y polarization direction are set to have different durations. Furthermore, a respective weighting factor $a_x$, $b_x$, $a_y$, $b_y$ is provided for the delayed and undelayed oscillation component signals $S_x$ and $S_y$, in order to allow accurate mixing of the delayed and undelayed signals $S_x$ and $S_y$ for in each case one polarization direction x, y. These can be matched to the respective prevailing circumstances.

The following values have been found to be suitable in experiments with an Nd:YAG laser:

$\tau_x$=0.5-2.8 µs $a_x$=0.2-1

$b_x$=0.2-1

$\tau_y$=0.08-0.6 µs $a_y$=0.2-1

$b_y$=0.2-1

The controlled variable $\delta_u$ is then determined using the relationship $$\delta_u = a_x S_x(t) - b_x S_x(t-\tau_x) + a_y S_y(t) - b_y S_y(t-\tau_y).$$

By way of example, in each case one difference $a_{xi}S_x(t-\tau_i) - b_{xi}S_x(t)$ can optionally also be replaced by a notch filter with a matched Q-factor and bandwidth. One embodiment of a suitable notch filter is, for example, provided by the Robinson rejection filter.

The controlled variable $\delta_u$ is preferably also multiplied by a variable gain factor k which, for example, is 20 to 100.

This clearly shows that the differences formed by the differential amplifiers 16a, 16b are added by a downstream adder 17 and the sum is amplified by the gain factor k in order to be supplied to the bias circuit, that is to say to the bias or modulation point. If notch filters are used, their output voltages are supplied to the downstream adder 17, their sum is amplified by the gain factor k, in order to be supplied to the bias circuit, that is to say to the bias or modulation point.

Figure 3:
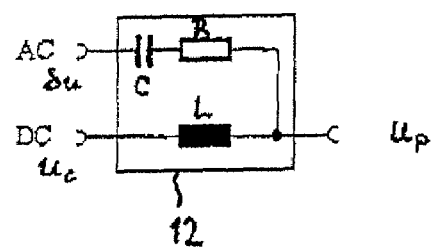
FIG. 3 shows a schematic illustration of a bias point for modulation of the controlled variable.

FIG. 3 shows a circuit diagram of the bias circuit 12, in order to modulate the signal of the controlled variable $\delta_u(t)$ onto the DC voltage $U_c$, which is produced by the laser diode controller 13, for the pump laser diode 14. An inductance L is connected in the path between the laser diode controller 13 and the pump laser diode 14, for this purpose. A series circuit comprising a capacitance C and a resistance R is provided at the output of the inductance L, that is to say the input of the pump laser diode 14, with the controlled variable $\delta_u$ being passed to the input of the capacitance C.

The bias point, that is to say the modulation point, in which the control voltage $\delta_u$ emitted from the actuating element 11 is modulated onto the constant from the basic voltage $U_c$, produced by the laser diode controller 13, for the pump laser diode 14, can be provided by the schematic circuit illustrated in FIG. 3 by installing a high-pass filter, which is formed from the capacitance C and the resistance connected in series, in one branch, in order to modulate AC voltage signals (AC) onto a DC voltage level (DC) in the other branch. In order to decouple the AC voltage signals (AC) (which originate from the control system) from the laser diode controller 13 which is located in the DC voltage path of the design, the DC voltage path through the bias circuit 12 contains the inductance L.

A current source which is controlled by the actuating element 11 can optionally also be used.

By way of example, the delay elements 15a, 15b may be in the form of lines, in which the finite propagation speed of signals is used for delay purposes. Digital delay lines can also be used.

One advantageous variant of the delay elements 15a, 15b has all-pass filter elements, the number of which is governed by the delay times $\tau_x$, $\tau_y$ required for the dynamics. In order to prevent distortion of the chaotic laser output signal within the control system, the all-pass filter elements should be operated as Bessel filters. This ensures a frequency-independent group delay time, which means that the oscillation component signals $S_x(t)$ and $S_y(t)$ are not distorted during the delay process.

Trimming elements should be provided within the delay elements 15a, 15b in order to compensate for component tolerances and to stabilize the amplitude of the oscillation component signals $S_x(t)$ and $S_y(t)$ that are to be delayed.

Figure 4:
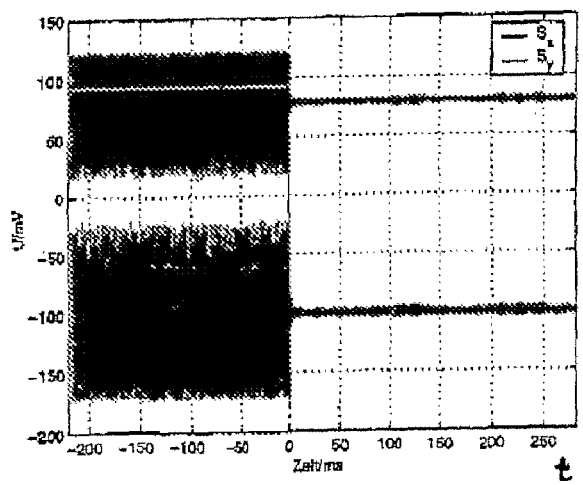
FIG. 4 shows a graph of the wave components $S_x$, $S_y$ in the x and y polarization directions over time before and after use of the control process according to the invention.

FIG. 4 shows a graph of the intensity of the oscillation components $S_x(t)$ in the x polarization direction and $S_y(t)$ in the y polarization direction, plotted against the time. The x oscillation component $S_x(t)$ is the upper time signal, and the y oscillation component $S_y(t)$ is the lower time signal, plotted against the time t. In this case, the control system of the regulator illustrated in FIG. 1 is switched on at the time t=0.

As can be seen, intensity fluctuations which initially occur in the laser radiation when the control system is still switched off occur in the time period from −220 to 0 ms. After declaration of the control system according to the invention, as described above, at the time t=0, this results in a considerable reduction in the amplitudes of the oscillation components $S_x(t)$ and $S_y(t)$ and thus in the amplitudes of the chaotic intensity fluctuations.

This was achieved by the use of two time-delayed oscillation component signals $S_x(t-\tau_x)$ and $S_y(t-\tau_y)$ with delay times $\tau_x \neq \tau_y$ of different duration, and their weighted difference with respect to the undelayed oscillation component signals $S_x$ and $S_y$ by superimposition for creation of the controlled variable $\delta_u$.

The invention claimed is:

1. A method for controlling an oscillatory system having at least one measurement variable, by
    detection of at least one oscillation component (S(t)) over the time (t) in the form of at least one measurement variable;
characterized by
    determination of a controlled variable ($\delta_u$) for controlling the oscillatory system from the sum of the weighted differences of the oscillation component ($S_1(t-\tau_1), S_2(t-\tau_2)$), which has been delayed in the case of one measurement variable at least twice by different delay times ($\tau_1>0$, $\tau_2>0$), and its respective undelayed oscillation component ($S_1(t)$ and $S_2(t)$), and in the case of a plurality of measurement variables, oscillation components ($S_i(t-\tau_i)$), which have in each case been delayed at least once by a specific delay time ($\tau_i>0$), and their respective undelayed oscillation components ($S_i(t)$) using the relationship $$S_u = a_1 S_1(t) - b_1 S_1(t-\tau_1) + \ldots + a_n S_n(t) - b_n S_n(t-\tau_n),$$

where $a_1, \ldots, a_n$ and $b_1, \ldots, b_n$ are weighting factors for the oscillation components $S_1, \ldots, S_n$ of the measurement variables.

2. The method as claimed in claim 1 for controlling oscillations with multimode generators which produce two polarization directions (x,y) characterized by detection of the oscillation components ($S_x(t), S_y(t)$) in each case for the two polarization directions (x,y) over the time (t), determination of a controlled variable ($\delta_u$) for controlling the multimode generator from the sum of the respective differences between the oscillation components ($S_x(t)$ and $S_y(t)$), weighted for the first and second polarization direction (x,y), and their time-delayed oscillation components ($S_x(t-\tau_{xi})$ and $S_y(t-\tau_{yi})$) which have been detected in advance for specific delay times ($\tau_{xi}>0$, $\tau_{yi}>0$), using the relationship $$\delta_u = a_{x1}S_x(t) - b_{x1}S_x(t-\tau_{x1}) + \ldots + a_{xn}S_x(t) - b_{xn}S_x(t-\tau_{xn}) + a_{y1}S_y(t) - b_{y1}S_y(t-\tau_{y1}) + \ldots + a_{yn}S_y(t) - b_{yn}S_y(t-\tau_{yn})$$

where $a_{x1}, \ldots, a_{xn}, b_{x1}, \ldots, b_{xn}, a_{y1}, \ldots, a_{yn}, b_{y1}, \ldots, b_{yn}$ are weighting factors for the oscillation components $S_x$ and $S_y$ as well as their time-delayed signals in the two polarization directions (x,y), where n=1 to N.

3. The method as claimed in claim 2, characterized in that the delay times ($\tau_{xi}$) for the first polarization direction (x) are chosen to be different to the delay times ($\tau_{yi}$) for the second polarization direction (y).

4. The method as claimed in claim 1, characterized in that a difference from a delayed and associated undelayed oscillation component is in each case replaced by a notch filter with a matched Q-factor and bandwidth.

5. The method as claimed in claim 1, characterized by the controlled variable ($\delta_u$) being amplified by a gain factor (k).

6. The method as claimed in claim 1, characterized in that the delay times ($\tau_i, \tau_{xi}, \tau_{yi}$) or the cut-off frequencies of notch filters for the at least one oscillation component are different.

7. The method as claimed in claim 1, characterized by dynamic variation of the delay times ($\tau_i, \tau_{xi}, \tau_{yi}$), of the weighting factors ($a_i, a_{xi}, a_{yi}, b_i, b_{xi}, b_{yi}$) and/or cut-off frequencies of notch filters.

8. The method as claimed claim 1, characterized in that the oscillatory system is a laser, in particular a frequency-doubled laser.

9. The method as claimed in claim 8, characterized in that the controlled variable ($\delta_u$) is modulated onto pump current for a pump laser diode which is provided for operation of the laser.

10. The method as claimed in claim 1, characterized by the oscillation components ($S_i(t)$) being delayed by means of an analog or digital delay line.

11. The method as claimed in claim 1, characterized by wave components ($S_i(t)$) in each case being delayed by all-pass filter elements.

12. The method as claimed in claim 11, characterized by operation of the all-pass filter elements as Bessel filters.

13. An oscillatory system for production of oscillations having a first sensor for detection of at least one oscillation component ($S(t)$) over the time (t) in the form of at least one measurement variable and having an actuating element for determination of a controlled variable ($\delta_u$) from the sum of the weighted differences of the oscillation component, which has been delayed in the case of one measurement variable at least twice by different delay times ($\delta_1>0, \delta_2>0$), and its respective undelayed oscillation component, and in the case of a plurality of measurement variables, their oscillation components ($S_i(t-\delta_i)$), which have in each case been delayed at least once by a specific delay time ($\delta_i>0$), and their respective undelayed oscillation components ($S_i(t)$) using the relationship $$\delta_u = a_1 S_1(t) - b_1 S_1(t-\tau_1) + \ldots + a_n S_n(t) - b_n S_n(t-\tau_n),$$

where $a_1, \ldots, a_n$ and $b_1, \ldots, b_n$ are weighting factors for the oscillation components $S_1, \ldots, S_n$ of the measurement variables and the controlled variable ($\delta_u$) is used to control the oscillatory system.

14. The oscillatory system as claimed in claim 13 as a multimode generator or frequency-doubled Nd:YAG laser with a frequency-doubler crystal for production of oscillations with two polarization directions, having a first sensor for detection of the oscillation component ($S_x(t)$) in the first polarization direction (x), having a second sensor for detection of the oscillation component ($S_y(t)$) in the second polarization direction (y) over the time (t), and having an actuating element for determination of a controlled variable ($\delta_u$) from the sum of the respective differences between the oscillation components ($S_x(t)$ and $S_y(t)$), weighted for the first and second polarization direction (x,y), and their detected oscillation components ($S_x(t-\tau_{xi})$ and $S_y(t-\tau_{yi})$) which have been time-delayed at least once by specific delay times ($\tau_{xi}>0, \tau_{yi}>0$), using the relationship $$\delta_u = a_{x1}S_x(t) - b_{x1}S_x(t-\tau_{x1}) + \ldots + a_{xn}S_x(t) - b_{xn}S_x(t-\tau_{xn}) + a_{y1}S_y(t) - b_{y1}S_y(t-\tau_{y1}) + \ldots + a_{yn}S_y(t) - b_{yn}S_y(t-\tau_{yn})$$

where $a_{x1}, \ldots, a_{xn}, b_{x1}, \ldots, b_{xn}, a_{y1}, \ldots, a_{yn}, b_{y1}, \ldots, b_{yn}$ are weighting factors for the oscillation components of the polarization direction (x,y), where n equals 1 to N and the controlled variable ($\delta_u$) is used to control the multimode generator.

15. The oscillatory system as claimed in claim 14, characterized in that the delay times ($\tau_{xi}$) for the first polarization direction (x) are different to the delay time ($\tau_{yi}$) for the second polarization direction (y).

16. The oscillatory system as claimed in claim 14, characterized in that the Nd:YAG laser is operated with a pump laser diode, and the controlled variable ($\delta_u$) is modulated onto pump current for the pump laser diode.

17. The oscillatory system as claimed in claim 13, characterized in that a difference from a delayed and an associated undelayed oscillation component is in each case replaced by a notch filter with a matched Q-factor and bandwidth.

18. The oscillatory system as claimed in claim 13, characterized by an amplifier for the controlled variable ($\delta_u$) by a gain factor (k).

19. The oscillatory system as claimed in claim 13, characterized in that the delay times ($\tau_i>0$) and/or cut-off frequencies of the notch filters are different.

20. The oscillatory system as claimed in claim 13, characterized in that an actuating element is designed for dynamic variation of the delay times ($\tau_i, \tau_{xi}, \tau_{yi}$), of the weighting factors ($a_i, a_{xi}, a_{yi}, b_i, b_{xi}, b_{yi}$ and/or cut-off frequencies.

21. The oscillatory system as claimed in claim 13, characterized by in each case at least one analog or digital delay line for the detected oscillation component signals ($S_x(t), S_y(t)$).

22. The oscillatory system as claimed in claim 13, characterized by all-pass filter elements for delaying the detected oscillation component signals.

23. The oscillatory system as claimed in claim 22, characterized in that the all-pass filter elements are in the form of Bessel filters.

\* \* \* \* \*